March 31, 1959 J. F. JOY 2,879,884
MOBILE CONVEYOR APPARATUS FOR UNDERGROUND MINES
Original Filed Nov. 4, 1950 11 Sheets-Sheet 1
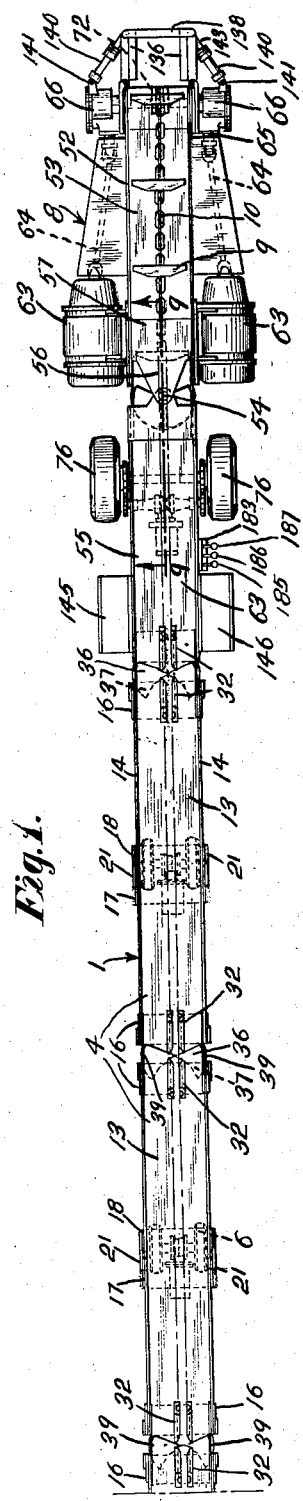
Fig. 1.
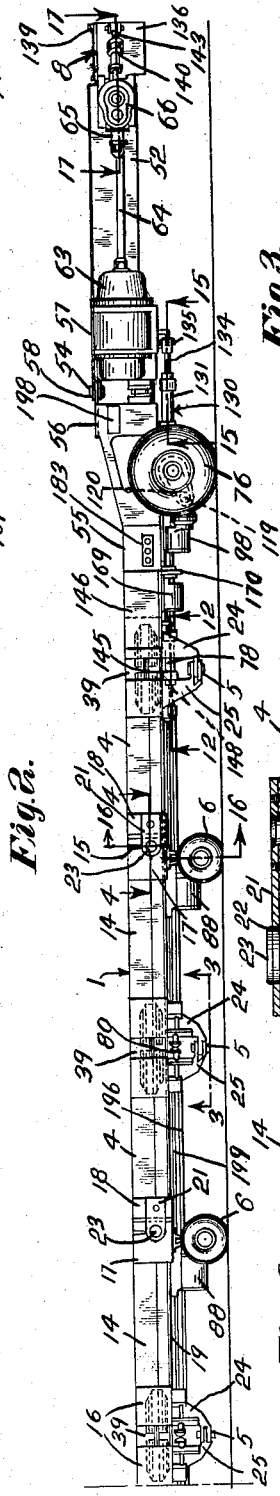
Fig. 2.
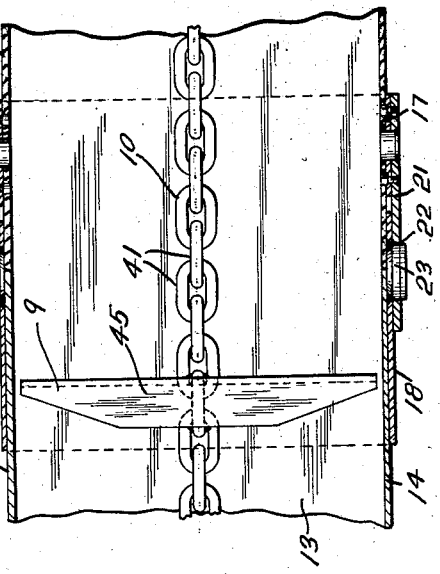
Fig. 3.
Fig. 4.
Inventor:
Joseph F. Joy.
By Charles F. Osgood,
attorney.

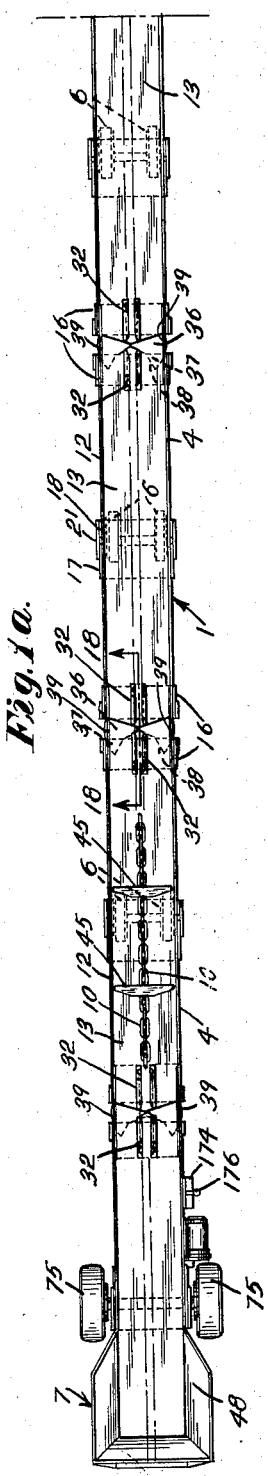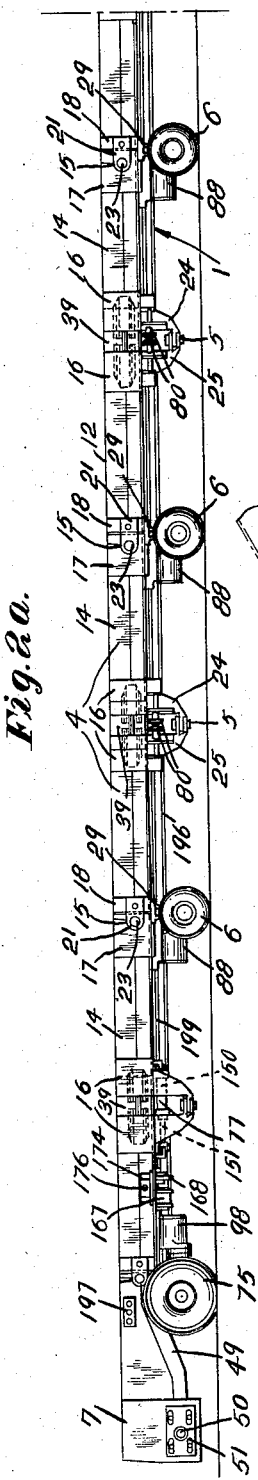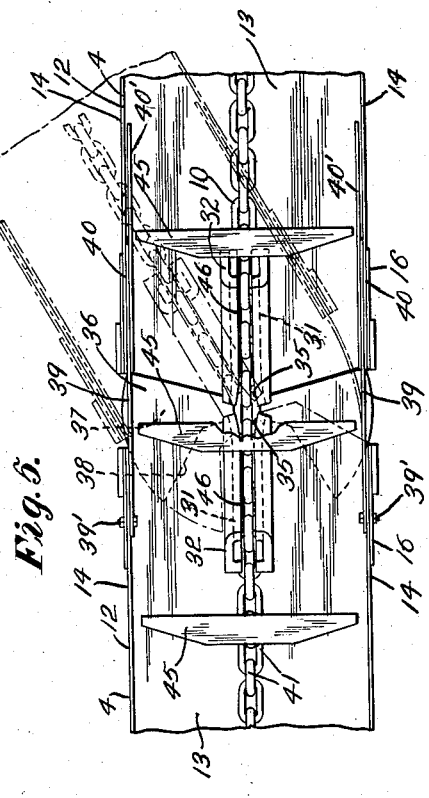

March 31, 1959  J. F. JOY  2,879,884
MOBILE CONVEYOR APPARATUS FOR UNDERGROUND MINES
Original Filed Nov. 4, 1950  11 Sheets—Sheet 3
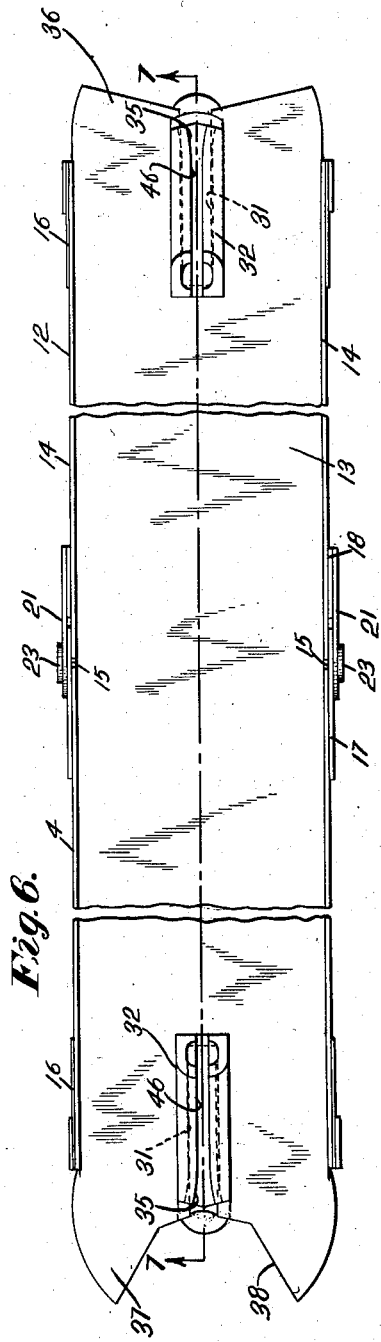
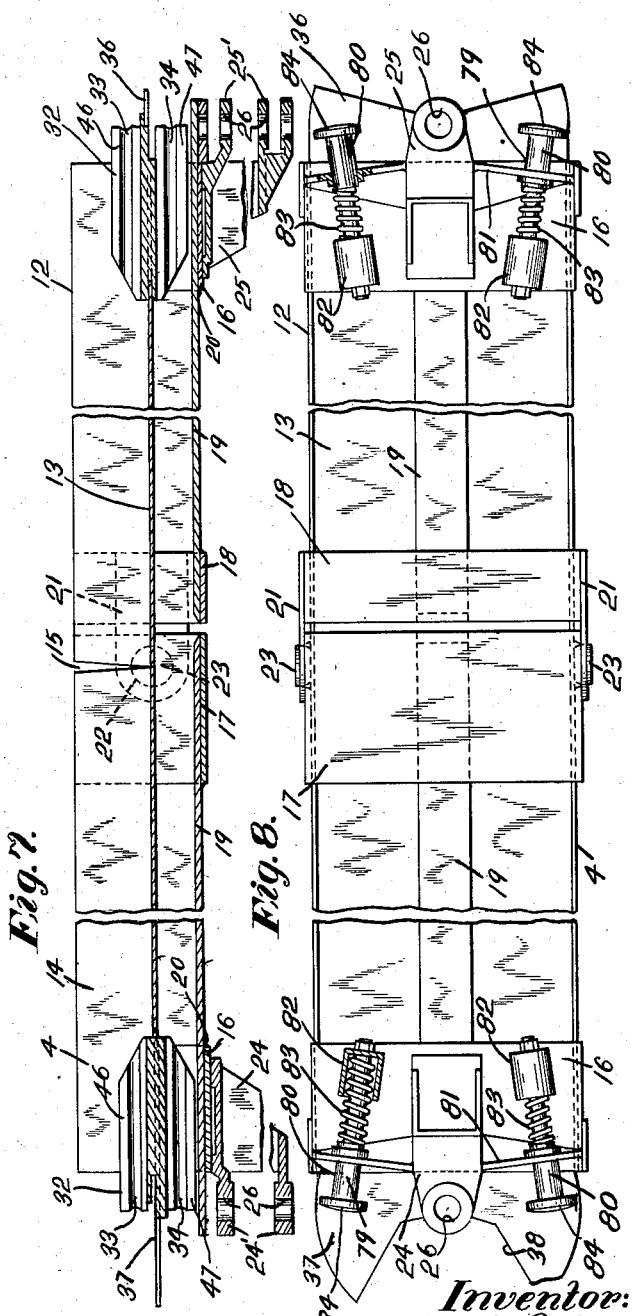
Inventor:
Joseph F. Joy.
By Charles F. Osgood,
Attorney.

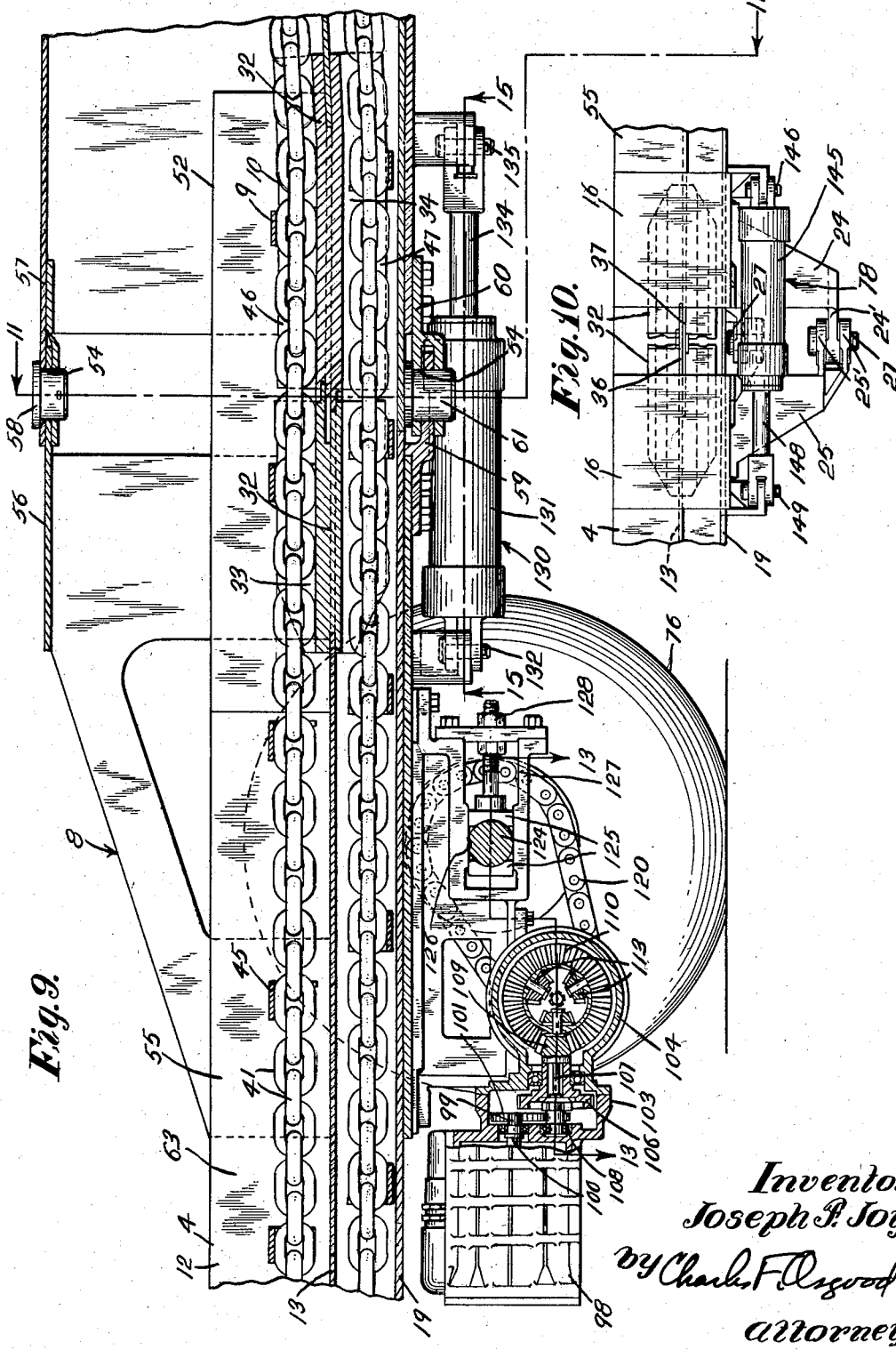

March 31, 1959     J. F. JOY     2,879,884
MOBILE CONVEYOR APPARATUS FOR UNDERGROUND MINES
Original Filed Nov. 4, 1950     11 Sheets-Sheet 5
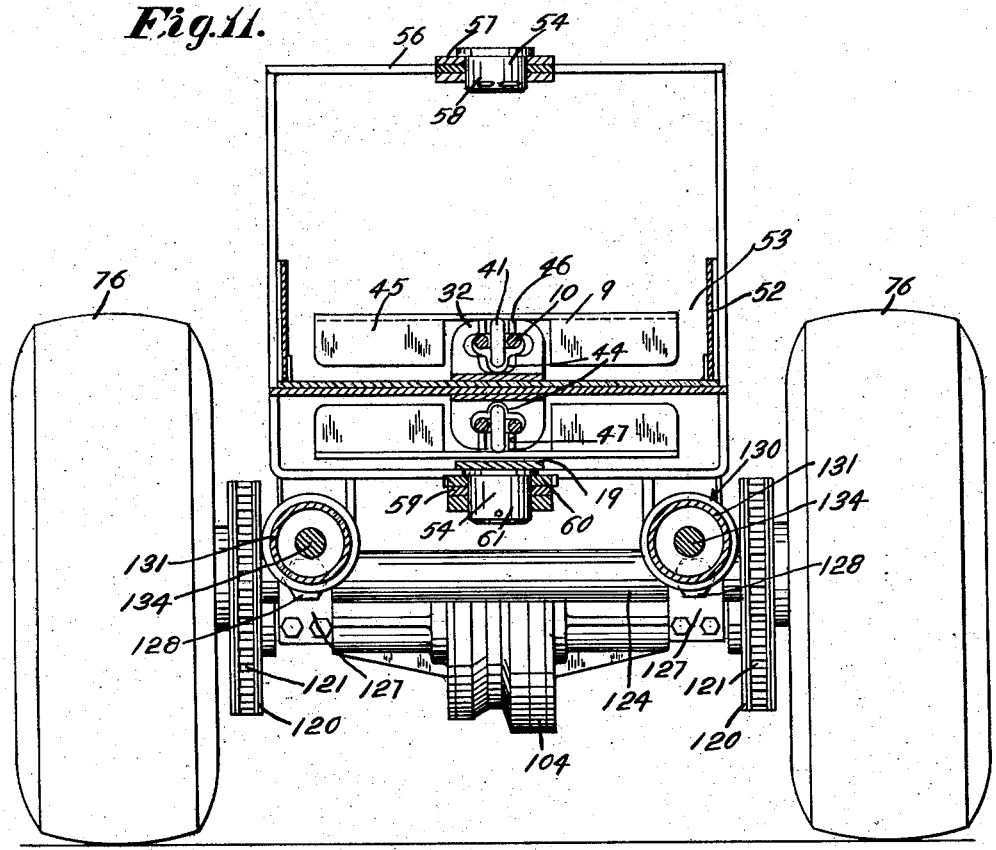
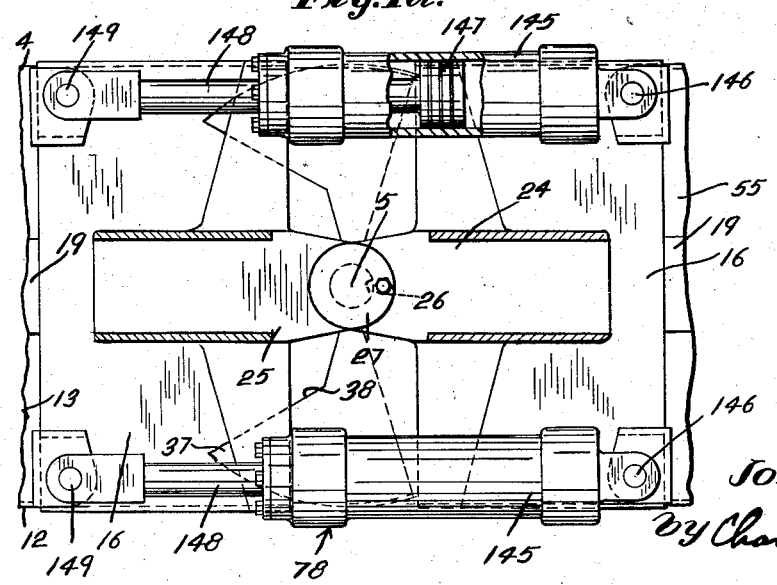
Inventor:
Joseph F. Joy.
By Charles F. Osgood
Attorney.

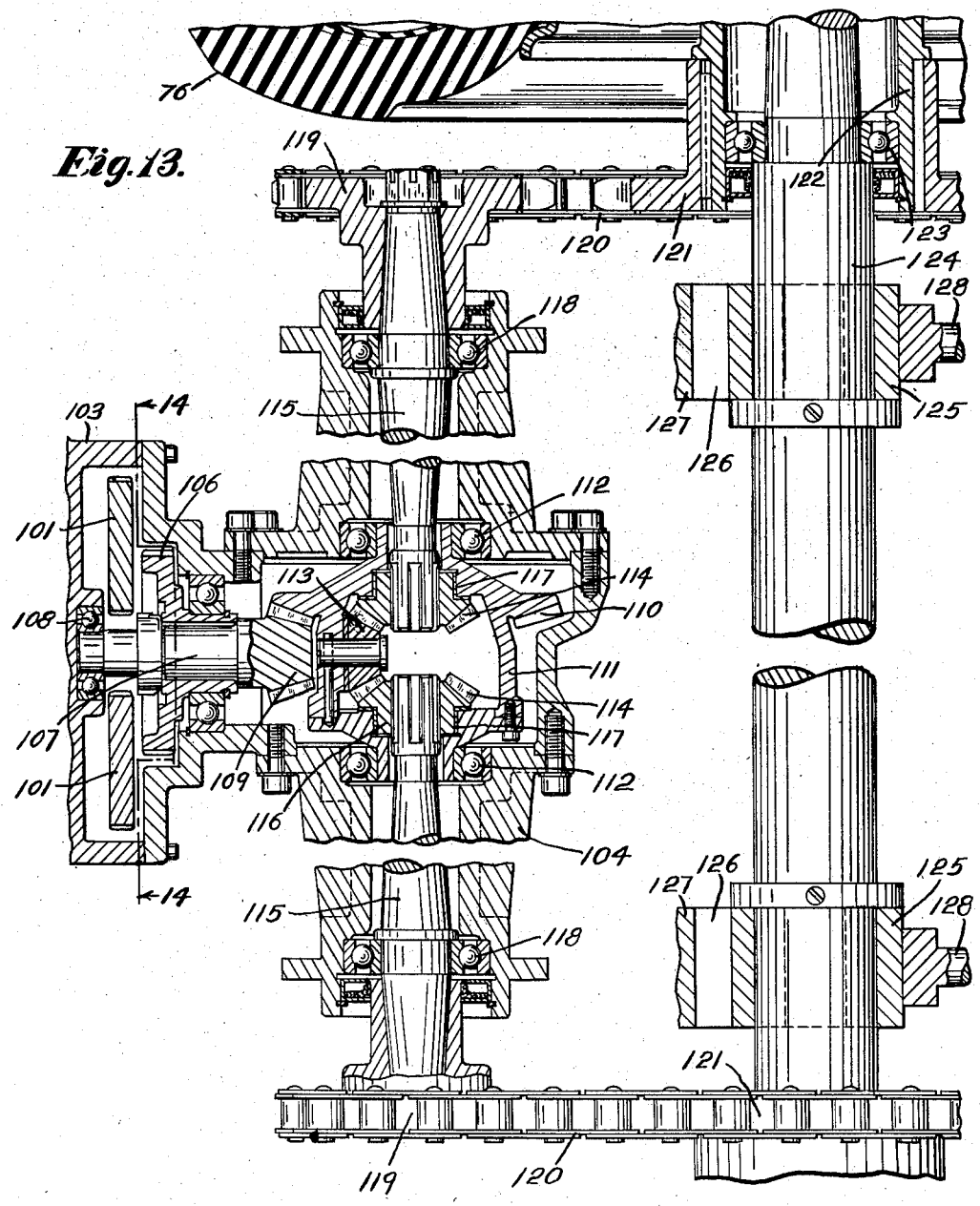

March 31, 1959 J. F. JOY 2,879,884
MOBILE CONVEYOR APPARATUS FOR UNDERGROUND MINES
Original Filed Nov. 4, 1950 11 Sheets-Sheet 8

Inventor:
Joseph F. Joy.
by Charles F. Osgood,
attorney.

March 31, 1959  J. F. JOY  2,879,884
MOBILE CONVEYOR APPARATUS FOR UNDERGROUND MINES
Original Filed Nov. 4, 1950  11 Sheets-Sheet 9

Inventor:
Joseph F. Joy,
By Charles F. Osgood,
Attorney.

March 31, 1959    J. F. JOY    2,879,884
MOBILE CONVEYOR APPARATUS FOR UNDERGROUND MINES
Original Filed Nov. 4, 1950    11 Sheets—Sheet 10
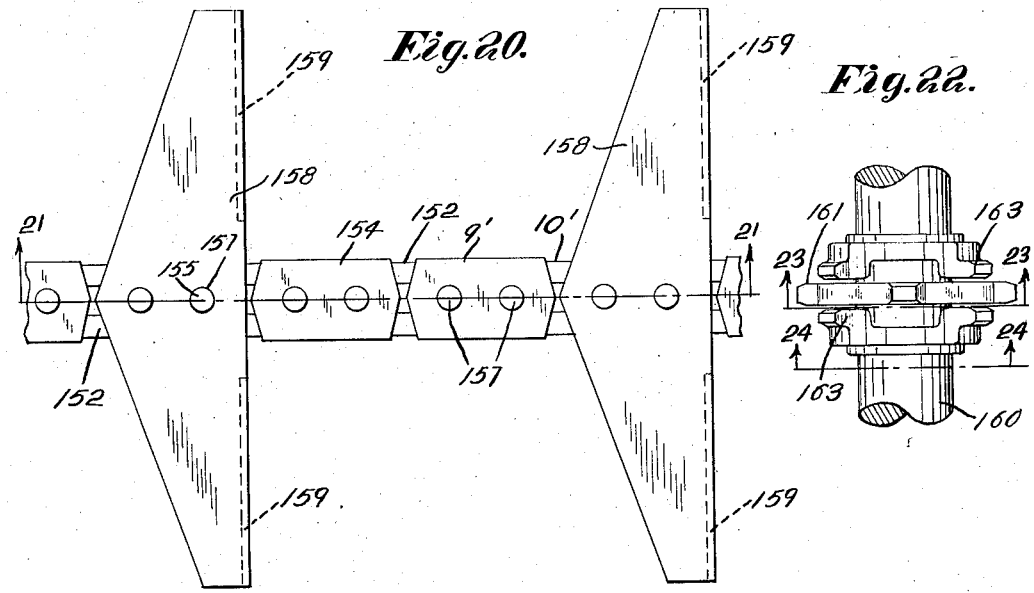
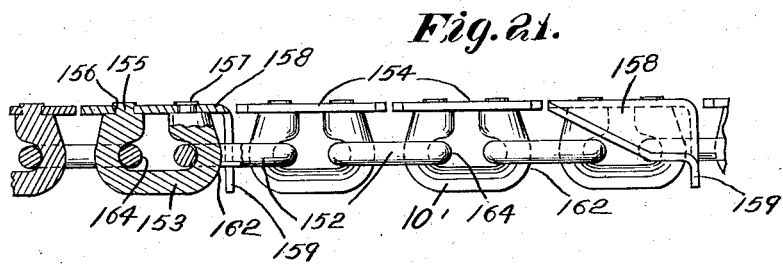
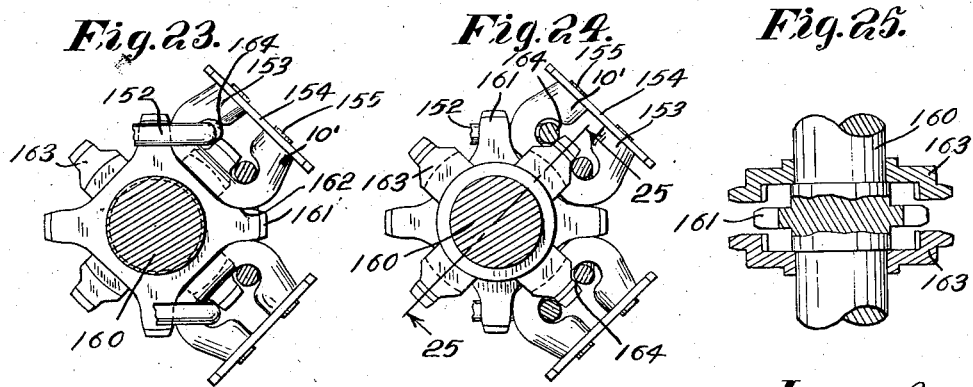
Inventor:
Joseph F. Joy.
By Charles F. Osgood.
Attorney.

March 31, 1959 J. F. JOY 2,879,884
MOBILE CONVEYOR APPARATUS FOR UNDERGROUND MINES
Original Filed Nov. 4, 1950 11 Sheets-Sheet 11
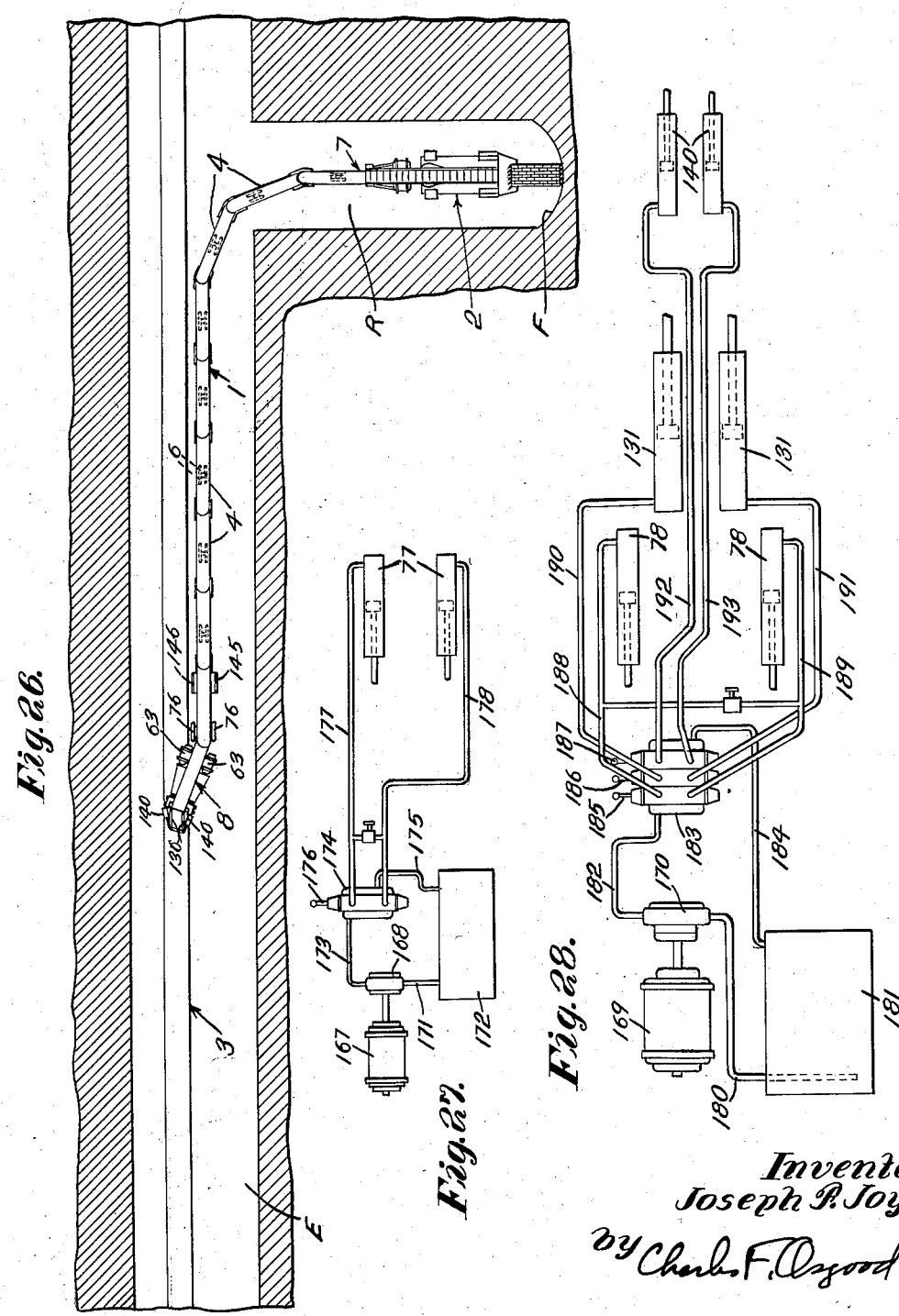
Inventor:
Joseph F. Joy.
by Charles F. Osgood,
Attorney.

United States Patent Office 2,879,884
Patented Mar. 31, 1959

2,879,884

MOBILE CONVEYOR APPARATUS FOR UNDERGROUND MINES

Joseph F. Joy, Fort Pierce, Fla., assignor to Joy Manufacturing Company, Pittsburgh, Pa., a corporation of Pennsylvania Continuation of application Serial No. 194,096, November 4, 1950. This application December 12, 1955, Serial No. 552,653

5 Claims. (Cl. 198—109)

This invention relates to conveyor apparatus and more particularly to a mobile endless conveyor especially designed for use in conjunction with continuous mining apparatus in accordance with modern methods of continuous mining of coal or other minerals in underground mines.

A continuous mining apparatus of a known modern design is highly maneuverable and embodies means for dislodging and disintegrating the mineral of a solid mine vein, and receiving and conveying means whereby the disintegrated mineral may be rapidly discharged from the apparatus as mining progresses. It has been found that present day haulage or transfer equipment is inadequate both in capacity and maneuverability to receive and convey away the disintegrated mineral as it is rapidly discharged from the continuous mining apparatus, resulting in considerable delay in the handling of the disintegrated mineral and substantially decreasing the overall efficiency of the mining equipment. The present invention contemplates improvements over known types of conveying and haulage equipment in that the conveyor is readily mobile whereby it may travel with the mining apparatus as mining progresses and is of large capacity and is flexibly articulated so that it may readily follow the mining apparatus and may move freely around the sharply curved and relatively restricted passageways and over the uneven floor of an underground mine. Thus, by means of the present invention no substantial interruptions in the operation of the continuous mining apparatus as it dislodges and disintegrates the mineral and rapidly removes the disintegrated mineral from the vicinity of the working face, are encountered. The mobile conveyor of the present invention is a self-propelled unit and may comprise a series of articulated conveyor frame sections disposed in end to end relation and having traction wheels and associated steering and controlling means, and the articulated frame sections provide guiding means for a flexible endless flight conveyor which extends along the length of the articulated conveyor frame, and the traction wheels are so ararnged, and the parts are so articulated and made flexible that the conveyor unit, as it travels about the mine, may readily flex both laterally and vertically so that it may readily negotiate the sharply curved and restricted passageways and the uneven floor of an underground mine. The traction wheels of the series of articulated conveyor sections are so arranged that an even distribution of the tractive effort throughout the length of the apparatus is obtained, thereby to insure proper tracking of the wheels as the apparatus travels around relatively sharp corners common to mine passageways. Yieldable buffer devices are arranged between the conveyor sections at opposite sides of the pivotal connections between the sections and these devices tend to hold the conveyor sections in longitudinal alignment during traveling of the apparatus along a straightaway and yield to permit relative angular movement of the conveyor sections during turning of the apparatus. Since the operator at one end of the conveyor unit, due to the relatively great length of the latter, may be out of sight of an operator at the other end, improved control means and signal devices are provided whereby the conveyor unit may at all times be safely under control and whereby the conveyor unit may be maneuvered quickly and with comparative ease thereby readily to follow the movements of the continuous mining apparatus with which it is associated. The conveyor unit as it travels forwardly with the mining apparatus has its discharge end overlying an endless floor conveyor in the main or panel entry, so that the conveyor unit, within its limits of operation, at all times discharges onto the main entry or panel conveyor.

An object of the present invention is to provide an improved mobile, self propelled conveying apparatus especially designed for use in underground mines. Another object is to provide an improved traveling conveyor which is highly mobile and which may be readily maneuvered to accommodate itself to varying conditions encountered in the continuous mining of coal underground. Yet another object is to provide an improved endless conveyor guided for circulation along a series of articulated conveyor frame sections and having improved propelling and steering means whereby the conveyor may readily negotiate the sharply curved passageways of an underground mine. A further object is to provide an improved traction wheel structure associated with each of the articulated conveyor frame sections whereby the conveyor may readily turn laterally around sharp curves. Another object is to provide an improved arrangement of the supporting and propelling wheels for the apparatus whereby an even distribution of the tractive effort throughout the length of the apparatus is obtained, thereby to insure proper tracking of the wheels as the apparatus travels around sharp corners. A further object is to provide improved yieldable stabilizing buffers which serve to hold the conveyor sections in longitudinal alignment during traveling of the apparatus along a straight-away and which yield to permit turning of the conveyor sections during traveling around a curve. Still another object is to provide an improved steering arrangement for a mobile conveyor unit. A still further object is to provide improved control means and signal control means and signal devices embodied in the mobile conveyor whereby the latter may at all times be under complete control of the operator. Another object is to provide an improved conveyor frame structure for a mobile conveyor. Still another object is to provide an improved conveyor chain structure and improved conveyor chain driving means. These and other objects and advantages of the invention will, however, hereinafter more fully appear as the description proceeds.

This application is a continuation of my copending application, Serial No. 194,096, filed November 4, 1950 and now abandoned.

In the accompanying drawings there are shown for purposes of illustration one preferred form and a modification which the invention may assume in practice.

In these drawings:

Figs. 1 and 1a, taken together, constitute a top plan view of the improved mobile conveyor unit.

Figs. 2 and 2a, taken together, constitute a side elevational view of the conveyor unit shown in Figs. 1 and 1a.

Fig. 3 is an enlarged fragmentary bottom plan view, taken on the line 3—3 of Fig. 2, illustrating one of the swivel connection between a pair of intermediate conveyor frame sections.

Fig. 4 is an enlarged horizontal section taken substantially on line 4—4 of Fig. 2.

Fig. 5 is an enlarged fragmentary plan view of a pair of cooperating conveyor frame sections, illustrating details of the guides for the conveyor chain.

Fig. 6 is a top plan view of one of the intermediate conveyor frame elements.

Fig. 7 is a central longitudinal section taken on line 7—7 of Fig. 6.

Fig. 8 is a bottom view of the conveyor frame element shown in Fig. 6.

Fig. 9 is an enlarged central longitudinal vertical sectional view taken substantially on line 9—9 of Fig. 1.

Fig. 10 is an enlarged fragmentary side elevational view of the portion of the conveyor structure shown in Fig. 2, with parts omitted to facilitate illustration.

Fig. 11 is a cross section taken substantially on line 11—11 of Fig. 9.

Fig. 12 is a horizontal section taken substantially on line 12—12 of Fig. 2.

Fig. 13 is a horizontal section taken substantially on the plane of line 13—13 of Fig. 9, showing details of the traction wheel drive.

Fig. 20 is a fragmentary plan view illustrating the modified form of endless conveyor element.

Fig. 21 is a vertical section taken on line 21—21 of Fig. 20, with parts shown in side elevation.

Fig. 22 is a plan view of the drive sprocket associated with the conveyor element of Figs. 20 and 21.

Fig. 23 is a vertical section taken on line 23—23 of Fig. 22.

Fig. 24 is a vertical section taken on line 24—24 of Fig. 22.

Fig. 25 is a transverse section taken on line 25—25 of Fig. 24.

Fig. 26 is a diagrammatic view showing the mobile conveyor in conjunction with a continuous miner and a main entry or panel conveyor and illustrating the same in an operating position in an underground mine.

Figs. 27 and 28 are diagrammatic views illustrating the hydraulic fluid system.

Figure 14:
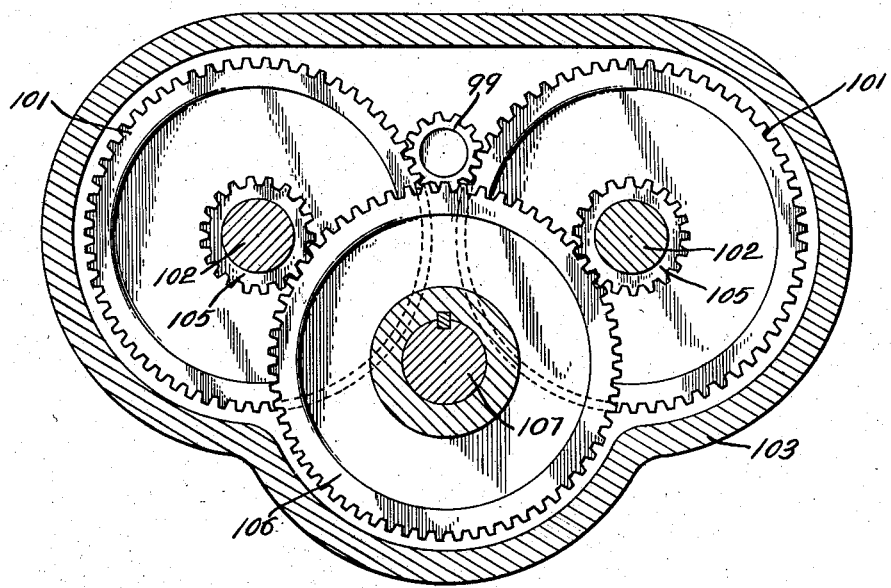
Fig. 14 is an enlarged transverse detail section taken on line 14—14 of Fig. 13, showing a portion of the wheel drive gearing.

In this illustrative construction, as shown in the drawings, the mobile conveyor unit is generally designated 1 and is adapted for association with a continuous mining apparatus generally designated 2 and with a conveyor generally designated 3, which may be either a panel or main entry conveyor. Evidently, the improved conveyor unit may be associated with other types of high capacity mining apparatus such as a mobile loading machine, and the conveyor unit may discharge onto other types of entry or panel conveyors such as a shaker conveyor of high capacity.

The mobile or traveling conveyor unit 1 generally comprises a series of articulated intermediate conveyor frame sections 4 pivotally connected together on vertical axes 5 in end to end relation and each having traction wheels 6. The receiving or head section of the conveyor is generally designated 7 and the discharge or tail section is generally designated 8. Guided for circulation relative to the series of intermediate conveyor frame sections 4 and the end sections 7 and 8 is a flexible endless flight conveyor 9 having a central universal drive chain 10. Associated within the conveyor unit is improved means for effecting and controlling steering and improved control and signal devices whereby the conveyor unit may be controlled from either end and whereby an operator at one end of the conveyor may signal an operator at the opposite end even when the conveyor unit is of substantial length, say a length from three hundred feet to six hundred feet, and when one end is out of sight from the other end as the conveyor unit travels through the relatively restricted and sharply curved passageways of an underground mine.

Figure 16:
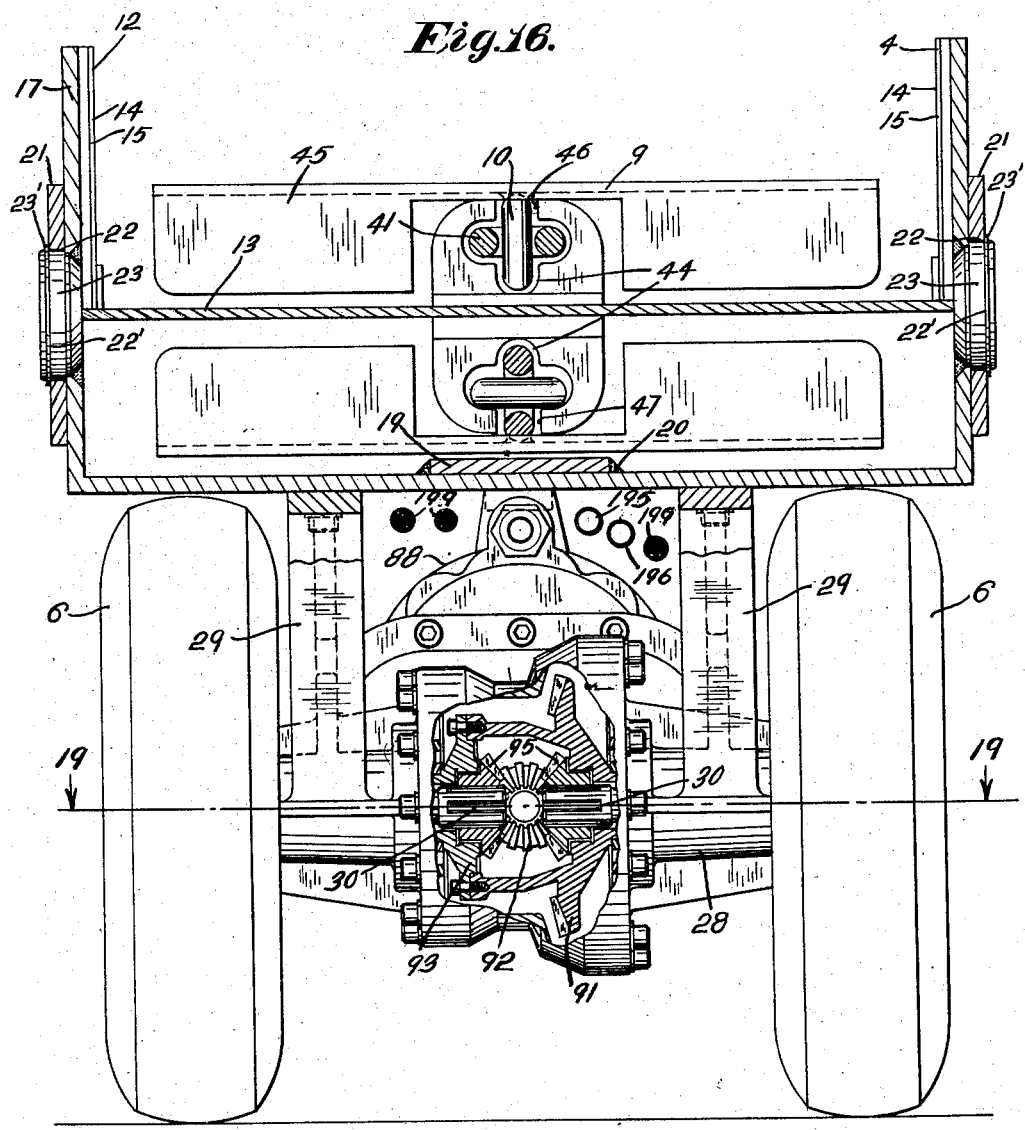
Fig. 16 is an enlarged cross sectional view taken substantially on line 16—16 of Fig. 2.

Each of the intermediate conveyor frame sections 4 between the discharge and receiving ends of the conveyor unit is similar in design and structure to the other intermediate sections, and each section comprises an elongated horizontal frame 12 including a horizontal bottom plate 13 and upright side plates 14, 14, these plates cooperating to form an elongated troughlike structure (see Fig. 16). The vertical side plates 14 are vertically notched at 15 midway between their ends, as shown most clearly in Fig. 7, and these notches are V-shaped and extend vertically substantially more than half-way through the side plates so that the side plates may flex slightly in vertical planes. Secured as by welding to the opposite ends of the side and bottom plates are generally U-shaped frames 16 (Figs. 6, 7 and 8) and secured likewise as by welding to the side and bottom plates near the longitudinal center thereof are U-shaped frames 17 and 18 located at opposite sides of the vertical notches 15. Longitudinal bracing bars or stiffeners 19 disposed beneath the bottom plate 13 are secured as by welding at 20 to the top surfaces of the horizontal bottom portions of the U-shaped frames 16, 17 and 18, thereby rigidly to reinforce the elongated frame structure. Secured as by screws (see Fig. 4) to the outer sides of the frame 18 are vertical plates 21 which pivotally engage at 22 lateral pivot pins 23 secured as by welding to the vertical side plates of the frame 17. The pivot pins 23 are circumferentially grooved at 22' (see Fig. 16) to receive conventional split snap-rings 23' which engage the outer vertical surfaces of the vertical plates 21 to retain the parts against lateral separation. Thus, the troughlike frame structure of each intermediate frame section 4 of the conveyor unit may flex slightly in a vertical direction; there being provided a combined pivotal and flexing joint midway between the ends of the frame structure of each frame section.

Figure 18:
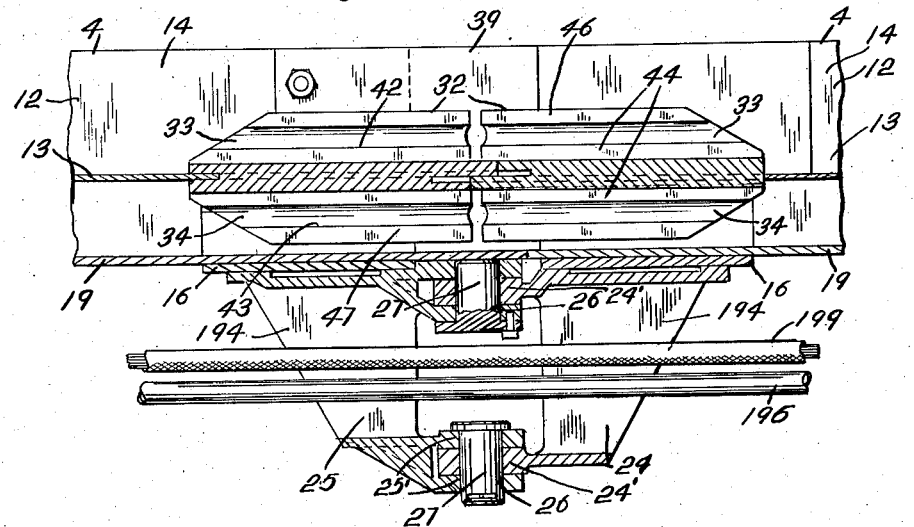
Fig. 18 is an enlarged view in central longitudinal vertical section taken substantially on line 18—18 of Fig. 1a, with the conveyor chain omitted.

The adjacent ends of the intermediate frame sections 4 have brackets 24 and 25 fixed, as by welding, to the end frames 16 respectively and these brackets are formed with horizontal overlapping portions 24' and 25' having aligned vertical openings 26 which receive vertical pivot pins 27, as shown in Fig. 18. Each intermediate frame section 4 has arranged substantially midway between its ends, an axle housing 28 having upstanding brackets 29 rigidly secured to the bottom of the frame 17, as is likewise clearly shown in Fig. 16, and the axles 30 of the traction wheels 6 (which are herein desirably provided with pneumatic tires) are suitably journaled within the housings 28. The adjacent end portions of the conveyor frame sections 4 are longitudinally slotted midway between their sides at 31 and fitted in these slots and secured rigidly as by welding to the frame sections are guides 32 for the central chain 10 of the endless conveyor. These guides have upper and lower guideways 33 and 34 for the upper and lower runs of the endless conveyor chain, and the adjacent ends of the guideways are flared at 35 so that the conveyor chain may run smoothly relative to the guides even when the conveyor frame sections 4 are relatively angularly disposed as the result of pivotal movement about the pivots 5. The bottom plates 13 of the adjacent troughlike portions of the frame sections 4 have longitudinally overlapping portions 36 and 37 as shown in Fig. 10 and the horizontal portion 37 is laterally cut away or recessed at 38 (see Figs. 5 and 12) so as to clear the sides of the adjacent chain guide when one frame section is swung laterally about its pivot with respect to the other.

The vertical sides of the troughlike frame structure of the frame sections are made flexible, as shown in Fig. 5, at the pivotal joints between the series of frame sections whereby the sides of the troughs may flex laterally as the frame sections swing angularly relative to one another about their axes of pivotal connection. Each flexible side portion comprises a flexible side plate 39 arranged vertically with the bottom edge close to the bottom plate 13 and this side plate is secured at 39' to the inner side of each side plate 14. These flexible plates extend across the gaps disposed between the adjacent ends of the side plates. Each flexible side plate is guided at 40 in a guide 40' carried at the inner side of the side plate of the adjacent frame section, so that when the sections are swung into different angularly related positions the flexible side plates 39 may slide in these guides to compensate for the varying distances apart of the adjacent ends of the side plates. In Fig. 5, an angular position of one frame section is shown in dotted lines and in such position the adjacent ends of the side plates 14 are disposed close together at one side while at the other side they have moved wide apart. As the frame sections are swung relative to one another, the flexible side plates not only slide in their guides but also flex or bend laterally in the manner shown. Thus, due to the provision of the flexible sides and overlapping bottoms of the sections the possibility of substantial spillage of material at the joints between the series of frame sections as the latter swing laterally and flex up and down, is substantially reduced.

The central chain 10 of the endless flight conveyor is desirably of the conventional cable type and includes connected closed links 41 and the guideways 33 and 34 of the guides 32 are formed to receive the links of this chain as shown in Fig. 11, and the horizontal links run along horizontal surfaces 42 and 43 of the upper and lower guideways respectively while the intermediate vertical links are guided in shallow grooves 44, as shown in Figs. 11 and 16. The conveyor chain has secured thereto at intervals along its length transverse conveyor flights 45 to which are welded certain of the vertical chain links, and the flights on the upper run of the conveyor chain as the latter is driven, move along the bottom plates 13 of the conveyor frame sections to move the disintegrated mineral or other loose material therealong. The upper guideway is open at its top at 46 and the lower guideway is open at its bottom at 47, so that the vertical links may extend into connection with the flights, in the manner shown. The conveyor chain moves along the receiving and discharge sections 7 and 8 of the conveyor unit in a manner to be later described. The conveyor chain per se has been claimed in a divisional application, Serial No. 252,143, filed October 19, 1951, now matured into Patent No. 2,672,971, granted March 23, 1954.

The front receiving or head end 7 of the conveyor unit is formed with a large receptacle or hopperlike portion 48 which is adapted to underlie the discharge end of the continuous mining apparatus 2 in such manner as to receive the disintegrated material discharged from the mining apparatus and the bottom of this hopper is downwardly and rearwardly inclined at 49 and is provided with suitable guideways along which the receiving end portion of the endless flight conveyor 9 is guided for circulation. The conveyor chain 10 passes around a suitable guide sprocket or idler mounted on a transverse shaft 50 which is provided with a conventional shiftable adjusting device 51 whereby the guide sprocket and shaft may be adjusted relative to the front frame section to vary the tension of the conveyor drive chain, in a well known manner.

The rear discharge or delivery end 8 of the conveyor has an elevated discharge portion 52 likewise providing guideways along which the conveyor chain 10 is guided for circulation and this discharge portion has a troughlike passageway 53. The discharge portion 52 of the discharge conveyor section is pivotally mounted at 54 on the forward frame section 55 to swing horizontally with respect thereto. As shown in Fig. 9, the frame section 55 has an elevated horizontal portion 56 and the discharge portion 52 has a forward horizontal frame portion 57 overlapping the portion 56 and these overlapping portions have aligned openings for receiving the vertical pivot pin 58. The rearward portion of the forward frame 55 has a bracket 59 (Fig. 9) rigidly secured thereto and this bracket has a horizontal portion which projects between superimposed horizontal portions of a bracket 60 secured to the front end of the discharge frame 52 and these bracket portions have aligned openings which receive a vertical pivot pin 61. The pivot pins 58 and 61 are arranged in vertical axial alignment and thereby provide a relatively rugged pivotal mounting for the pivoted rear frame 52. The front frame 55 of the rear discharge end of the conveyor also has a troughlike structure 63 which communicates with the troughlike structure of the adjacent conveyor frame section 4 and with the troughlike passageway 53 of the swingable rear discharge portion 52. The frame 55, like the frame portion 52, is provided with suitable guideways for the conveyor chain, and one of the guides 32 is carried by this frame section, as shown in Fig. 1.

The gaps between the adjacent ends of the relatively swingable frames 52 and 55, are maintained closed by a flexible sliding plate and guide arrangement similar to those between the series of conveyor frame sections 4, in a manner like that shown and described in connection with Fig. 5.

Mounted at the opposite sides of the horizontally swingable frame section 52 of the rear discharge end 8 of the conveyor unit are motors 63, herein desirably electric motors, having their power shafts connected by universal shafting 64 to the longitudinal shafts 65 (see Fig. 17) suitably journaled in gear housings 66 secured to the opposite sides of the rearward portion of the frame portion 52. Driven by the shafts 65 are bevel gears 66' which mesh with and drive bevel gears 67 suitably secured to transverse shafts 68 likewise journaled within the gear housings 66. Secured to the shafts 68 are spur gears 69 meshing with spur gears 70 secured to the opposite ends of a transverse shaft 71. The shaft 71 has fixed thereto a chain sprocket 72 which engages and drives the central drive chain 10 of the endless conveyor. The frame of the receiving or head end 7 of the conveyor unit is provided with relatively large traction wheels 75 while the discharge or tail end 8 of the conveyor unit has its frame 55 supported by similar large traction wheels 76, and the wheels 75 and 76, like the wheels 6, are provided with pneumatic tires. Arranged between the end conveyor sections 4 and the receiving and discharge sections 7 and 8 are pairs of hydraulic steering cylinder devices 77 and 78 respectively, whereby the end sections 7 and 8 of the conveyor unit may be turned laterally in one direction or the other to effect steering of the conveyor unit, and the traction wheels 6 of the intermediate sections 4 of the conveyor unit are so located that the tractive effort is evenly distributed along the length of the apparatus in such manner as to cause the intermediate conveyor sections properly to trail the end steering sections as the conveyor travels in one direction or the other. Evidently, freely rotatable non-driven supporting wheels may be substituted for certain of the traction wheels, but in any case it is essential that the tractive effort be evenly distributed throughout the length of the apparatus.

To aid in the proper steering of the conveyor unit the intermediate conveyor frame sections 4 have yieldable devices or stabilizing buffers 79 arranged therebetween at opposite sides of the pivots 5 and these buffer devices yieldingly urge the frame sections toward their longitudinally aligned positions. These yieldable devices 79 comprise, as shown most clearly in Figs. 3 and 8, angularly related horizontal plungers 80 suitably guided in openings in depending flanges 81 integral with the end brackets and within aligned openings in lugs 82 secured as by welding to the bottoms of the end frames 16 of the conveyor sections, and coil springs 83 surrounding the plungers are arranged between shoulders on the plungers and the lugs 82 in such manner as to urge yieldingly the plungers outwardly to bring the heads 84 thereof into abutting contact in the manner shown. The plunger heads have their engaging surfaces curved to compensate for the relative lateral swinging of the conveyor frame sections.

Figure 19:
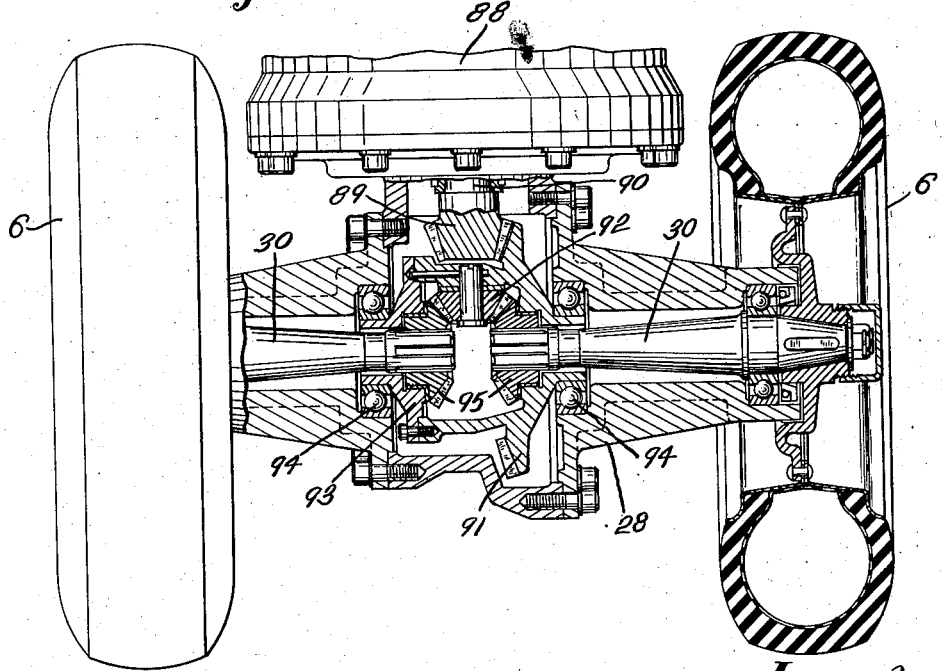
Fig. 19 is a horizontal section taken on line 19—19 of Fig. 16, showing details of the wheel drive.

Now referring to the drives for the wheels 6 of the intermediate frame sections 4 of the conveyor unit, it will be noted that secured to each of the axle housings 28, as shown in Fig. 19, is a reversible motor 88, herein desirably an electric motor, having a beveled pinion 89 secured to its power shaft 90, and this pinion meshes with and drives a large bevel gear 91 which in turn is connected through a differential to the aligned axles 30 to which the wheels are secured. This differential, as shown in Figs. 16 and 19, includes bevel planet gears 92 journaled on a differential housing 93 with which the bevel gear 91 is integrally formed and this housing is suitably journaled in bearings 94 supported within the axle housing. These planet gears mesh with and drive bevel gears 95 fixed to the adjacent ends of the wheel axles.

The drives for the large traction wheels 75 and 76 of the receiving and discharge sections 7 and 8 at the ends of the conveyor unit are similar in design, and as shown in Figs. 9 and 13, each comprises a reversible motor 98, herein likewise desirably an electric motor, having spur pinion 99 fixed to its power shaft 100. The pinion 99 meshes at its opposite sides with spur gears 101 (see also Fig. 14) journaled on parallel shafts 102 suitably supported within a gear casing 103 herein formed integral with the motor casing and rigidly secured to a gear housing 104, as shown in Fig. 9. This gear housing is secured to the bottom of the front frame portion 55 of the tail conveyor section 8. Secured to the shafts 102 are gears 105 which mesh with and drive a large spur gear 106 having its hub journaled in a bearing supported within the gear housing 104. The hub of the gear 106 is keyed to a coaxial shaft 107 which at its outer portion is supported by the gear hub and at its inner end is journaled in a bearing 108 supported within the gear casing 103 (see Fig. 13). Secured to the shaft 107 is a beveled pinion 109 meshing with a large bevel gear 110 herein formed integral with a rotatable differential housing 111, the latter journaled in bearings 112 supported within the gearing housing 104. This differential includes bevel planet gears 113 journaled on the differential housing and meshing with bevel gears 114 secured to the adjacent ends of aligned shafts 115. These shafts are supported at their inner ends within the hubs 116 of the bevel gears 114 which are journaled in bearing sleeves 117 supported within the differential housing, and the shafts at their outer portions are journaled in bearings 118 also supported within the gear housing 104. The shafts 115 have keyed at their remote ends, chain sprockets 119 connected by endless drive chains 120 to chain sprockets 121 secured to hubs 122 of the traction wheels. These wheels have their hubs journaled on bearings 123, supported by a transverse axle 124, the latter in turn being supported within adjustable blocks 125 (Fig. 9) which are slidingly guided within longitudinal guideways 126 within brackets 127 supported by the conveyor frame 55. Adjusting screw and nut devices 128 are provided for adjusting the blocks 125 within their guideways to vary the position of the axle 124 together with the chain sprockets 121 to vary the tension of the drive chain 120. Thus, the large traction wheels 75 and 76 of the receiving and discharge sections 7 and 8 of the mobile conveyor unit may be driven by the motors 98 through the reduction gearings and differentials, and their direction of drive may be reversed simply by reversing the motors. Likewise, the traction wheels 6 of the intermediate frame sections 4 of the conveyor unit may be driven in either direction by the reversible motors 88 through the reduction gearings and differentials. The electric control means for the series of motors 88 and the motors 98 will hereinafter be referred to.

If desired, the traction wheels 6 may be driven by a motor carried by one or both end sections of the mobile conveyor through self-adjusting universal shafting which may extend longitudinally of the apparatus between the series of articulated conveyor frame sections. Other conventional driving arrangements for the traction wheels may also be employed in well-known manners.

Figure 15:
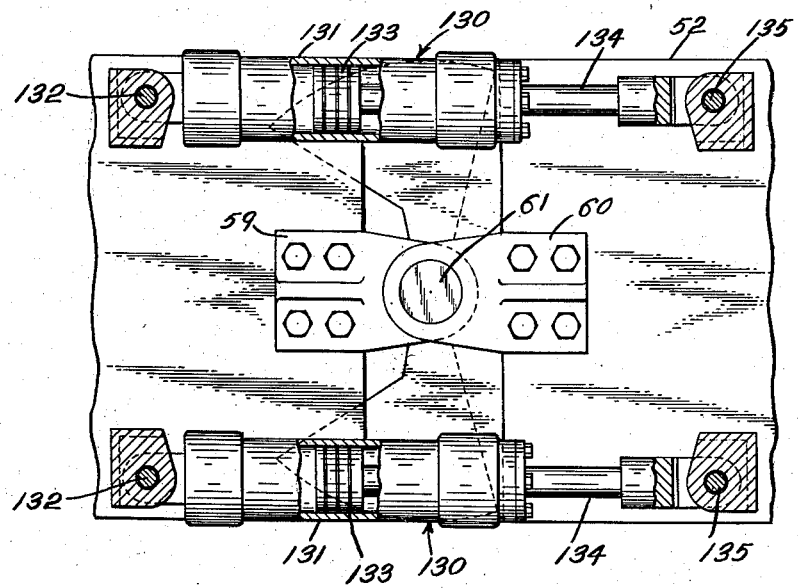
Fig. 15 is an enlarged horizontal sectional view taken substantially on line 15—15 of Figs. 2 and 9.

Now again referring to the detail structure of the tail or delivery section 8 of the conveyor unit, it will be noted that a pair of hydraulic swing devices 130 are provided for swinging the discharge frame portion 52 laterally, and such devices include hydraulic cylinders 131 (see Fig. 15) pivotally connected at 132 to brackets secured to the front frame portion to swing horizontally, and these cylinders contain reciprocable pistons 133 having their piston rods 134 projecting outwardly from the cylinders and pivotally connected at 135 to brackets secured to the swingable frame portion. Thus, when liquid under pressure is supplied to one end or the other of the hydraulic cylinders the discharge end 52 of the tail conveyor section may be swung laterally in one direction or the other as desired. When liquid is trapped in these cylinders the discharge frame 52 may be locked in adjusted position. The control valve means for these cylinders will later be described.

Figure 17:
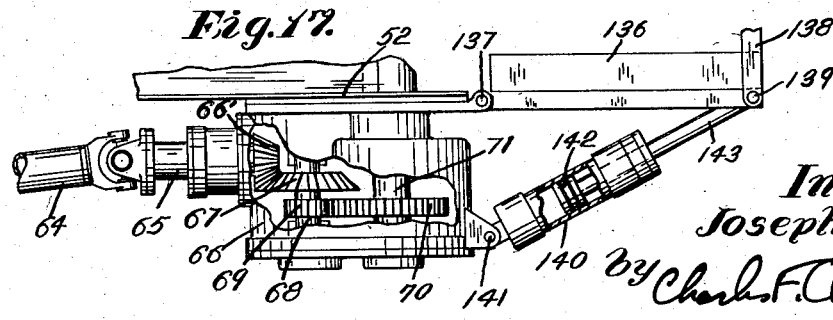
Fig. 17 is a horizontal section, on an enlarged scale, taken substantially on line 17—17 of Fig. 2 and illustrating details of the discharge end of the conveyor.

The rearward extremity of the discharge frame section 52 of the tail conveyor is provided with upright deflectors 136 in the form of vertical plates which are pivotally mounted at 137 at the opposite sides of the swingable frame portion of the tail conveyor section and these deflector plates are maintained in parallel relation by a cross link 138 pivotally connected at 139 at its ends to the outer portions of the deflector plates. Hydraulic cylinders 140 are pivotally mounted at 141 on the gear housings 66, as shown in Fig. 17, and these cylinders contain reciprocable pistons 142 having outwardly projecting piston rods 143 which are pivotally connected at the outer ends of the deflector plates. Thus, by supplying liquid under pressure to one or the other of the hydraulic cylinders the deflector plates may be swung horizontally in one direction or the other about their pivots to direct the material discharged from the conveyor in the desired direction. By trapping the liquid within the cylinders the deflector plates may be locked in adjusted position. The control valve means for the cylinders 140 will later be described.

Electrical control apparatus including control boxes 145 and 146 are mounted at the opposite sides of the front frame portion 55 of the tail conveyor section 8 for controlling the conveyor and traction wheel driving motors and these control boxes are arranged at the opposite sides of the traction wheels 76 from the swingable tail section 52 in such manner as to tend to counterbalance the overhanging tail section, as shown most clearly in Figs. 1 and 2.

The hydraulic steering cylinder devices 77 and 78 arranged respectively between the end intermediate conveyor sections 4 and the front receiving and tail sections 7 and 8 will now be described. In Fig. 12 the steering cylinder devices 78 for the tail section 8 is disclosed, and it will be understood that the steering cylinder devices for the receiving section 7 are similar in construction. The devices 78 comprise hydraulic cylinders 145 arranged at opposite sides of the pivots 5 and pivotally connected at 146 to brackets secured to the tail conveyor frame section 55, and contained in these cylinders are pistons 147 having their piston rods 148 projecting outwardly from the cylinders and pivotally connected at 149 to brackets secured to the adjacent intermediate frame section 4. The cylinders 150 and piston rods 151 of the steering cylinder devices 77 for the head frame 7 are respectively pivotally connected to the adjacent intermediate section 4 and the frame of the receiving section 7, in a similar manner. Thus, when liquid under pressure is properly supplied to the cylinders of these devices the front receiving and tail sections 7 and 8 of the mobile conveyor unit together with the traction wheels thereon may be turned either to the right or left to effect steering of the conveyor unit during traveling thereof. As previously mentioned, the traction wheels 6 of the intermediate frame sections 4 are so located that the intermediate traction wheels properly trail along the path of the wheels of the end sections being steered, so that the conveyor unit may readily negotiate the sharply curved and restricted passageways of the mine.

In Figs. 20 to 25 inclusive a modified form of endless conveyor structure is disclosed. The endless conveyor 9' of this embodiment has a central flexible drive chain 10' of a modified cable type including connected closed horizontal links 152 pivotally engaging linklike chain portions 153 secured to plates 154. The portions 153 have projections 155 fitted in openings 156 in the plates and these projections are headed over at 157 to secure rigidly the parts together. Certain of the plates 154 have secured thereto at intervals along the length of the chain, transverse conveyor flights 158, having right angle scraper portions 159 at opposite sides of the central drive chain. A conveyor drive shaft 160 (Fig. 25) has a central sprocket 161 secured thereto and the teeth of this sprocket are adapted to enter the openings of the closed links 152 and engage at 162 the rear end surfaces of the chain portions 153. Secured to the shaft 160 at opposite sides of the central sprocket 161 are side sprockets 163 whose teeth straddle the chain portions 153 and are adapted to engage at 164 the rear end surfaces of the closed links 152 at the opposite sides of the chain portions. The sprocket teeth are so staggered and are so constructed that any dirt which has access thereto may be freely discharged laterally. Thus, by the provision of this triple sprocket structure the conveyor chain may be effectively driven, while clogging of the sprocket with dirt, due to its novel design, is substantially avoided.

Now referring to the hydraulic fluid system, it will be noted that the receiving and tail sections 7 and 8 of the conveyor unit each have their own source of hydraulic pressure. A motor, herein desirably an electric motor 167, is mounted at one side of the frame of the receiving section 7 and drives a conventional liquid pump 168 (Fig. 2a), while a motor 169, likewise desirably an electric motor, is mounted at one side of the frame 55 of the tail section 8 and drives a conventional liquid pump 170 (Fig. 2). As shown diagrammatically in Fig. 27 the pump 168 of the receiving section has its suction side connected by a conduit 171 to a liquid tank 172 and its discharge side connected by a conduit 173 to a valve box 174. The discharge passage of the valve box is connected by a conduit 175 back to the tank. A slide valve 176 of conventional design is contained in the valve box and this valve is adapted to control the connection of conduits 177 and 178 leading to the steering devices 77 with either the supply or exhaust. The pump 170 has its suction side connected by conduit 180 to a liquid tank 181 and its discharge side connected by a conduit 182 to a valve box 183. The discharge passage of this valve box is connected by a conduit 184 back to the tank. The valve box is adapted to contain conventional slide valves 185, 186 and 187. The valve 185 is adapted to control the connection of conduits 188 and 189, leading to the steering devices 78 for the tail section, either to supply or exhaust. The valve 186 is adapted to control the connection of conduits 190 and 191, leading to the swing cylinders 131 for the pivoted discharge frame 52 of the tail conveyor, with either the supply or the exhaust. The slide valve 187 is adapted to control the connection of conduits 192 and 193, leading to the swing cylinders 140 for the rear deflector plates, with either the supply or exhaust. It will thus be seen that steering of the mobile conveyor unit may be effected by turning either the head section 7 or the tail section 8 under the control of the slide valves 176 and 185 and the discharge end of the tail section may be swung horizontally and the rear deflector plates may be adjusted under the control of the slide valves 186 and 187. By locating these several slide valves in their central positions in the valve boxes, liquid may be trapped in the several cylinders to hold the parts in adjusted position. It will be evident that the hydraulic system may be provided with conventional relief valve devices set to open at predetermined pressures whereby excessive hydraulic pressures are avoided, in a well-known manner.

As previously mentioned, the mobile conveyor unit is provided with control and signal devices at either end thereof whereby the conveyor unit may be at all times safely under control even when traveling through the sharply curved and restricted passageways of an underground mine. Extending longitudinally beneath the intermediate and end sections of the conveyor unit and passing through suitable openings 194 in the swivel brackets 24, 25 are conduits 195 and 196 which may be in the form of signaling and speaking tubes whereby an operator at either end of the conveyor unit may signal and converse with the operator at the other end of the unit even when such operators are out of sight of one another. Also, remote control switch devices 197 and 198 (see Figs. 2 and 2a) are arranged at either end section of the conveyor unit whereby an operator at either end of the conveyor unit may control the motors to effect drive of the endless conveyor and propulsion of the conveyor unit. Such remote control devices include several electric cables 199 which likewise extend longitudinally beneath the conveyor sections and through the openings in the swivel brackets in adjacency to the signal and speaking tube conduits. The cables and signal tubes may be loosely draped through the brackets or may be held in position by suitable clips, in an obvious manner. Thus, the mobile conveyor unit may be controlled from either end section.

Usual flame-proof detachable connectors or connector plugs may be provided in the electrical connections between each conveyor section so that the connections may be uncoupled when it is desired to add or remove conveyor sections, in a well-known manner.

The general mode of operation of the improved mobile conveying unit is as follows: The conveyor unit may be propelled about the mine by the traction motors 88 and 98 which drive the traction wheels 6, 75 and 76 and these motors may be controlled and reversed at will from either end section of the conveyor unit by the provision of the remote control equipment. Further, by the provision of the signal devices at either end of the conveyor unit, an operator at one end may signal and communicate with an operator at the other end even when the operators are out of sight of each other as the conveyor unit travels through the restricted passageways of the mine. The conveyor unit due to its flexible nature may readily turn laterally and flex up and down as it travels through the curved passageways and over the uneven floor of the mine.

During the mining and loading operation, the continuous mining apparatus 2 operates to dislodge and disintegrate the solid mineral of the mine vein and the working face is designated F in Fig. 26. The mobile conveyor unit may extend along the main or panel entry E of the mine and into the room R in which the continuous miner is operating, with the tail end portion of the conveyor unit extending longitudinally in substantial parallelism with the panel or main entry conveyor 3, with the discharge end of the tail section 8 overlying the conveyor 3 in the manner shown. As mining progresses, the continuous miner 2 is progressively advanced and the conveyor unit may be advanced with the continuous miner under the control of its propelling means. The discharge end or discharge conveyor of the continuous miner 2 overlies the receiving receptacle or hopper 48 of the receiving end 7 of the conveyor unit so that the latter receives the disintegrated material discharge from the miner during its operation, and the tail conveyor portion of the conveyor unit has its rear deflector plates 136 so adjusted that the disintegrated material is directed downwardly as it is discharged from the conveyor unit onto the conveyor 3. In the event the tail portion of the conveyor unit changes its angular relation with respect to the conveyor 3 during the mining and conveying operation, the discharge end of the tail section may be swung laterally to maintain its discharge end above the conveyor 3. As the continuous miner progressively advances during the mining operation the operator at the receiving end of the mobile conveyor unit may signal the operator at the tail end so that when the operator located at the tail section is out of sight of the operator at the receiving section, both operators may be conversant of the action at either end of the conveyor unit, thereby avoiding possible mistakes and substantially eliminating possible danger due to the lack of knowledge of just what is taking place in the room and out in the entry. The yieldable stabilizing buffers 79 serve to urge the conveyor sections toward longitudinal horizontal alignment and thus tend to hold the apparatus straight during traveling along a straightaway, and these buffers yield upon turning of the flame sections.

As the result of this invention an improved mobile conveying apparatus is provided which may be advanced with a mining apparatus with which it is associated so that the material discharged from the mining apparatus may be conveyed away in a substantially uninterrupted manner during the mining operation. By the provision of the mobile conveyor unit which may flex both laterally and vertically and by the provision of the propelling means for the unit the latter may travel through the sharply curved and restricted passageways and over the uneven floor of an underground mine. The improved conveyor unit as disclosed may travel behind the continuous miner continuously to receive the material discharged therefrom and by the provision of the adjustable tail section of the conveyor unit the latter may at all times discharge onto the conventional mine haulage equipment as the conveyor unit is advanced. The novel arrangement of the traction wheels for the intermediate conveyor sections and the improved steering means for the receiving and tail sections enables the conveyor unit to be readily steered as it travels about the mine, and the traction wheels of the intermediate conveyor sections, due to their location midway between the ends of the intermediate sections, may readily track the steering wheels of the steerable end sections. By the provision of the remote control means and the signal devices at the opposite end sections of the conveyor an operator located at either end of the conveyor may have knowledge of what is taking place at the opposite end as the conveyor unit travels through the curved and restricted passageways of the mine. By the provision of the traction wheels located centrally of the series of intermediate frame sections, an even distribution of the tractive effort along the length of the apparatus is made possible so that the intermediate wheels aways properly track as the apparatus travels along a curved path. The conveyor unit is not only extremely flexible and readily mobile but is also relatively rugged and compact, well adapted for its intended purpose. These and other advantages of the invention will be clearly apparent to those skilled in the art.

While there are in this application specifically described one form and a modification which the invention may assume in practice, it will be understood that this form and modification thereof are shown for purposes of illustration and that the invention may be further modified and embodied in various other forms without departing from its spirit or the scope of the appended claims.

What is new and I desire to secure by Letters Patent is:

1. In an elongated articulated mobile conveyor apparatus comprising a series of self-propelled intermediate conveyor sections and end traction units, one a receiving unit and the other a discharge unit, said conveyor sections and said traction units each having a troughlike passageway with said passageways extending end to end lengthwise of the apparatus, means at the adjacent ends of said intermediate conveyor sections and between the end conveyor sections and said traction units for pivotally connecting the same together whereby the apparatus may travel around curves and over an uneven or rolling ground surface, each intermediate conveyor section having an intermediate portion substantially midway between its ends free to flex in vertical planes, a universal endless conveyor chain extending along the length of the apparatus in said passageway and free to flex both in horizontal and vertical planes, propelling means for the apparatus comprising traction wheels arranged midway between the ends of said intermediate conveyor sections beneath said intermediate flexible portions thereof and a pair of traction wheels on said end traction units, said wheels constituting the sole supports for said conveyor sections and end units and said pivotal connecting means serving to prevent substantial tilting of said sections and units about their respective wheel axes while permitting lateral pivoting thereof during turning of the apparatus, and operator controllable steering means operatively associated with said end traction units whereby the apparatus may be steered as it moves over the ground.

2. A mobile conveyor apparatus as set forth in claim 1 wherein said intermediate flexible portion of each intermediate conveyor section comprises a vertically flexible plate at the bottom of said passageway and cooperating side elements providing a transverse pivot.

3. A mobile conveyor apparatus as set forth in claim 1 wherein guides for said conveyor chain extend longitudinally at the adjacent ends of said intermediate conveyor sections near said pivotal connecting means between said sections and providing guideways for said conveyor chain.

4. A mobile conveyor apparatus as set forth in claim 1 wherein said steering means comprises pairs of fluid operated cylinder and piston devices extending between the traction units and the adjacent end conveyor sections for turning said end units, said devices arranged longitudinally at opposite sides of said pivotal connecting means between said end conveyor sections and said end traction units.

5. A mobile conveyor apparatus as set forth in claim 1 wherein constantly acting devices are arranged longitudinally at opposite sides of said pivotal connecting means between said intermediate conveyor sections for tending to keep said conveyor sections in end-to-end alignment.

References Cited in the file of this patent

UNITED STATES PATENTS

| | | |
|---|---|---|
| 611,635 | Kelley | Oct. 4, 1898 |
| 834,195 | Cummings | Oct. 23, 1906 |
| 1,288,432 | Long | Dec. 17, 1918 |
| 2,420,009 | Osgood | May 6, 1947 |
| 2,491,158 | Brennan | Dec. 13, 1949 |
| 2,525,555 | Manierre | Oct. 10, 1950 |
| 2,592,532 | Beck | Apr. 15, 1952 |
| 2,594,695 | Storey | Apr. 29, 1952 |
| 2,597,345 | Lee | May 20, 1952 |
| 2,674,364 | Cartlidge | Apr. 6, 1954 |

FOREIGN PATENTS

| | | |
|---|---|---|
| 611,784 | Great Britain | Nov. 3, 1948 |